United States Patent
Feng et al.

(10) Patent No.: US 10,404,825 B2
(45) Date of Patent: Sep. 3, 2019

(54) REFRESHING FRAMEWORK

(71) Applicant: SAP SE, Walldorf (DE)

(72) Inventors: Jia Feng, Pleasanton, CA (US); Edward Lu, American Canyon, CA (US); Jessica Yang, Sunnyvale, CA (US); Zonghan Wu, Shanghai (CN); Ruibin Zhang, Shanghai (CN); Fangling Liu, Shanghai (CN); Xuejian Qiao, Shanghai (CN); Yan Fan, Shanghai (CN)

(73) Assignee: SAP SE, Walldorf (DE)

( * ) Notice: Subject to any disclaimer, the term of this patent is extended or adjusted under 35 U.S.C. 154(b) by 308 days.

(21) Appl. No.: 15/371,761

(22) Filed: Dec. 7, 2016

(65) Prior Publication Data

US 2018/0159952 A1 Jun. 7, 2018

(51) Int. Cl.
G06F 15/16 (2006.01)
H04L 29/08 (2006.01)
G06F 9/48 (2006.01)
G06F 16/22 (2019.01)

(52) U.S. Cl.
CPC ............ H04L 67/32 (2013.01); G06F 9/4843 (2013.01); G06F 16/22 (2019.01)

(58) Field of Classification Search
CPC ....... H04L 67/32; H04L 67/42; G06F 9/4843; G06F 17/30312
See application file for complete search history.

(56) References Cited

U.S. PATENT DOCUMENTS

| | | | |
|---|---|---|---|
| 9,811,390 B1* | 11/2017 | Ma ........................ | G06F 9/5038 |
| 2001/0042090 A1* | 11/2001 | Williams .............. | G06F 9/4881 |
| | | | 718/102 |
| 2004/0024845 A1* | 2/2004 | Fishhaut ........... | G06F 17/30893 |
| | | | 709/219 |
| 2011/0212783 A1* | 9/2011 | Dale ................... | H04L 67/1002 |
| | | | 463/42 |
| 2015/0347186 A1* | 12/2015 | Truong ................. | G06F 9/4881 |
| | | | 718/103 |
| 2016/0139952 A1* | 5/2016 | Geng .................... | G06F 9/4818 |
| | | | 718/103 |

* cited by examiner

*Primary Examiner* — Ario Etienne
*Assistant Examiner* — Kidest Mendaye
(74) *Attorney, Agent, or Firm* — Jones Day

(57) ABSTRACT

Refresh requests are received by a data source that each request a snapshot of current members of one of a plurality of dynamically changing groups and dynamically changing rules corresponding to such group. Thereafter, the data source queues the received plurality of refresh requests for selective execution or deletion into a new request queue. In addition, real-time execution of refresh jobs are initiated for all of queued refresh requests if a number of refresh requests in both of the new request queue and a waiting requests queue is below a pre-defined threshold. Alternatively, a job framework schedules execution of task jobs for a subset of the queued requests in the new request queue and the waiting requests queue if certain conditions are met.

20 Claims, 5 Drawing Sheets

FIG. 2    200

REFRESHING FRAMEWORK

BACKGROUND

Companies are increasingly defining groups of users within their respective computer architectures and software systems. These groups specify certain roles and permissions that are associated with each group which allow, for example, the users within such groups to access certain information and/or software systems associated with the corresponding company. Membership within such groups can dynamically change and, in addition, the roles and permissions for such groups can also dynamically change. In an effort to obtain an update on either the membership of a group or the roles and permissions of a group, client computing systems can request updates (sometimes referred to as refresh requests) to a backend system.

If a company is adding numerous employees or reorganizing its workforce, the backend system can quickly be inundated with more refresh requests than it can handle at a given time. This overload can result in the blocking of various requests or corresponding jobs and/or delayed responses by the backend server to the various refresh requests.

SUMMARY

In one aspect, a plurality of refresh requests are received by a data source that each request a snapshot of current members of one of a plurality of dynamically changing groups and dynamically changing rules corresponding to such group. Thereafter, the data source queues the received plurality of refresh requests for selective execution or deletion into a new request queue. In addition, real-time execution of refresh jobs are initiated for all of queued refresh requests if a number of refresh requests in both of the new request queue and a waiting requests queue is below a pre-defined threshold. Alternatively, a job framework schedules execution of task jobs for a subset of the queued requests in the new request queue and the waiting requests queue if a number of refresh requests in both of the new request queue and the waiting requests queue is above the pre-defined threshold, and moves any remaining refresh requests in the new request queue to the waiting requests queue after initiation of the execution of the task jobs.

Real-time execution of the refresh jobs or the scheduled execution of task jobs at pre-defined intervals can be continually initiated.

Refresh requests from the queued requests queue can be inserted into the task jobs after they are scheduled for execution.

The data source further can further include a failed requests queue in which refresh requests for failed task jobs are queued. With such arrangements, the real-time refresh jobs corresponding to all of the queued refresh requests can be executed only if the number of refresh requests in all of the new request queue, the waiting requests queue, and the failed requests is below the pre-defined threshold. Further, in such arrangements, execution of the task jobs corresponding to the subset of the queued refresh requests can be executed only if the number of refresh requests in all of the new request queue, the waiting requests queue, and the failed requests is above the pre-defined threshold.

A queue request status can be modified for each queued request after a status of such queued request changes.

Queued requests can be cleaned up from a respective queue after completion of the execution of the corresponding task job.

Duplicative refresh requests within the new requests queue can be deleted to avoid executing duplicative task jobs.

Overlapping refresh requests within the new requests queue can be consolidated into a single refresh request so that only a single corresponding task job is subsequently executed.

The data source can take many forms including, without limitation, a database, an in-memory database storing data primarily in main memory, and the like.

An application server can receive the plurality of refresh requests from a plurality of remote clients. In addition, the application server can relay the plurality of refresh requests to the database.

Results responsive to one or more refresh requests can be received and encapsulated in one of the real-time refresh jobs or the tasks jobs. The received results can be transmitted to the application server for relay to a corresponding remote client.

Each task job can encapsulate a plurality of refresh requests.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides a refresh request framework that minimizes the likelihood of system overload (resulting from spikes of multiple concurrent refresh frameworks) which, in turn, obviates the need to disable or otherwise limit the ability to perform refresh requests. In addition, the current subject matter is also advantageous in that it uses fewer processing resources and provides more rapid results in overload scenarios as compared to conventional systems.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
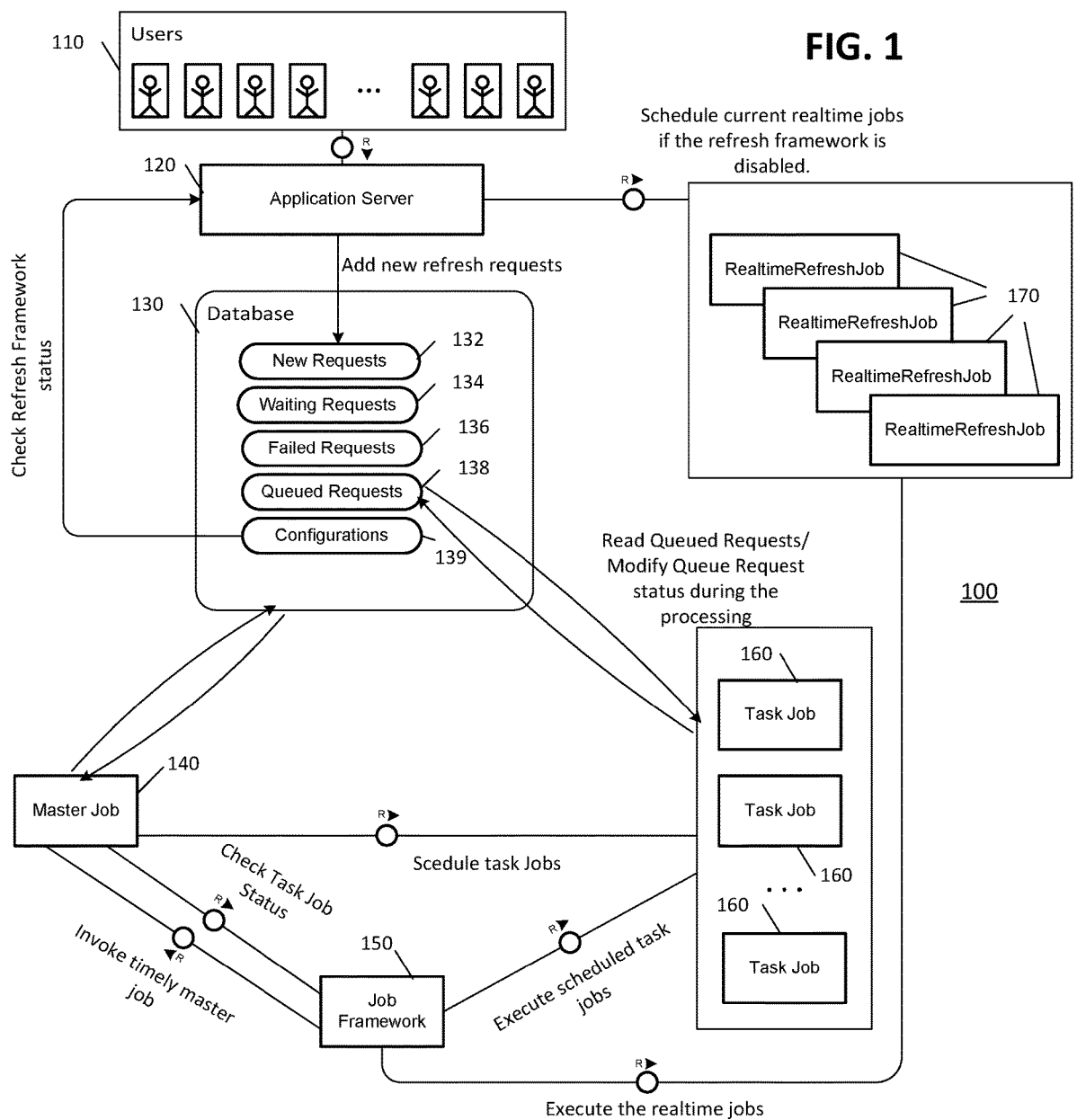
FIG. 1 is a system diagram illustrating a job framework for executing jobs for executing refresh requests.

FIG. 1 is a system diagram 100 illustrating a refresh job framework in which a plurality of client computing devices 110 periodically transmit refresh requests to an application server 120. These refresh requests can identify a specific user and/or groups of users to obtain a snapshot of the current roles and permissions associated with such user and/or group of users. With large scale systems with thousands of users and hundreds or more of groups, these groups and roles and permissions can dynamically change. The application server 120 can relay such requests and/or otherwise repackage such requests to query a database 130.

The database 130 can take many forms including, without limitation an in-memory database (e.g., a columnar in-memory database in which records are stored in main memory, etc.) or a disk-based database. The database 130 can also be distributed across multiple remote and distinct computing nodes and/or it can be a cloud-based database management system.

The database 130 can store or otherwise comprise a plurality of queues (which can, for example, be database partitions). These queues can include, for example, a new requests queue 132, a waiting requests queue 134, a failed requests queue 136, and a queue requests queue 138. In addition, the database can also store configuration information 139 which can be used, for example, to check the status of the overall refresh framework when the database 130 polls the application server 139.

The new requests queue 132 is a queue in which newly received refresh requests received from the application server 120 are queued. The waiting requests queue 134 is a secondary queue into which requests from the new requests queue 132 can be transferred when certain conditions are met. The failed requests queue 136 is a queue in which refresh requests which were previously set for execution but, for some reason, did not execute are placed. The queued requests queue 138 is a queue in which refresh requests from one or more of the new requests queue 132, waiting requests queue 136, and failed requests queue 136 are placed/transferred for execution by a job framework 150. The refresh requests in the queued requests queue 132 can be refresh requests that are already scheduled into task jobs. Stated differently, when task jobs 160 are scheduled, the assigned refresh requests will be saved in the queue 132.

A master job 140 (which can also be characterized as a daemon) can periodically (or on demand) access the database 130 to determine the composition of refresh requests in the various queues 132, 134, 136, and 138. Using this information, the master job 140 can generate and schedule a plurality of tasks jobs 160 which, in turn, each can execute one or more of the refresh requests (after such refresh requests are inserted into the task jobs 160—either singly or in combination—from the queued requests queue 138).

A job framework 150 (which can also be characterized as a backend asynchronous thread/pool resource configured for job handling) can provide overall control of the execution of the task jobs 160 which were originally scheduled by the master job 140 and can invoke various operations of the master job 140. The job framework 150 can also monitor execution status of all of the task jobs 160 and such status can be provided, either upon request or periodically) to the master job 140 (which can be used by the master job 140 for scheduling other tasks).

The master job 140 when determining whether or not to schedule the task jobs 160 can determine whether a number of refresh requests in some or all of the various queues 132, 134, 136, 138 exceeds a pre-determined threshold. This inquiry, for example, can be limited to new requests queue 132 and the waiting requests queue 134. If the number of refresh requests is lower than the pre-determined threshold, then the job framework 150 can be bypassed altogether and a plurality of real-time refresh jobs 170 can be executed in lieu of scheduled tasks jobs. The real-time refresh jobs 170 can otherwise be executed if the job framework 150 is disabled (e.g., the job framework 150 only is active during certain time periods during the day, etc.). If the number of refresh requests is above the pre-determined threshold, then the job framework 150 can execute as described above. In some variations, there can be different types of refresh requests and these types can also have different pre-defined thresholds and the like which are used to determine whether or not to schedule task jobs 160 or to execute real-time refresh jobs 170. In addition, the master job 140 can take into account various factors such as costs of execution for each task job 160 when determining when and in which order to execute various task jobs and/or when determining whether or not to consolidate any of the queued refresh requests.

Figure 2:
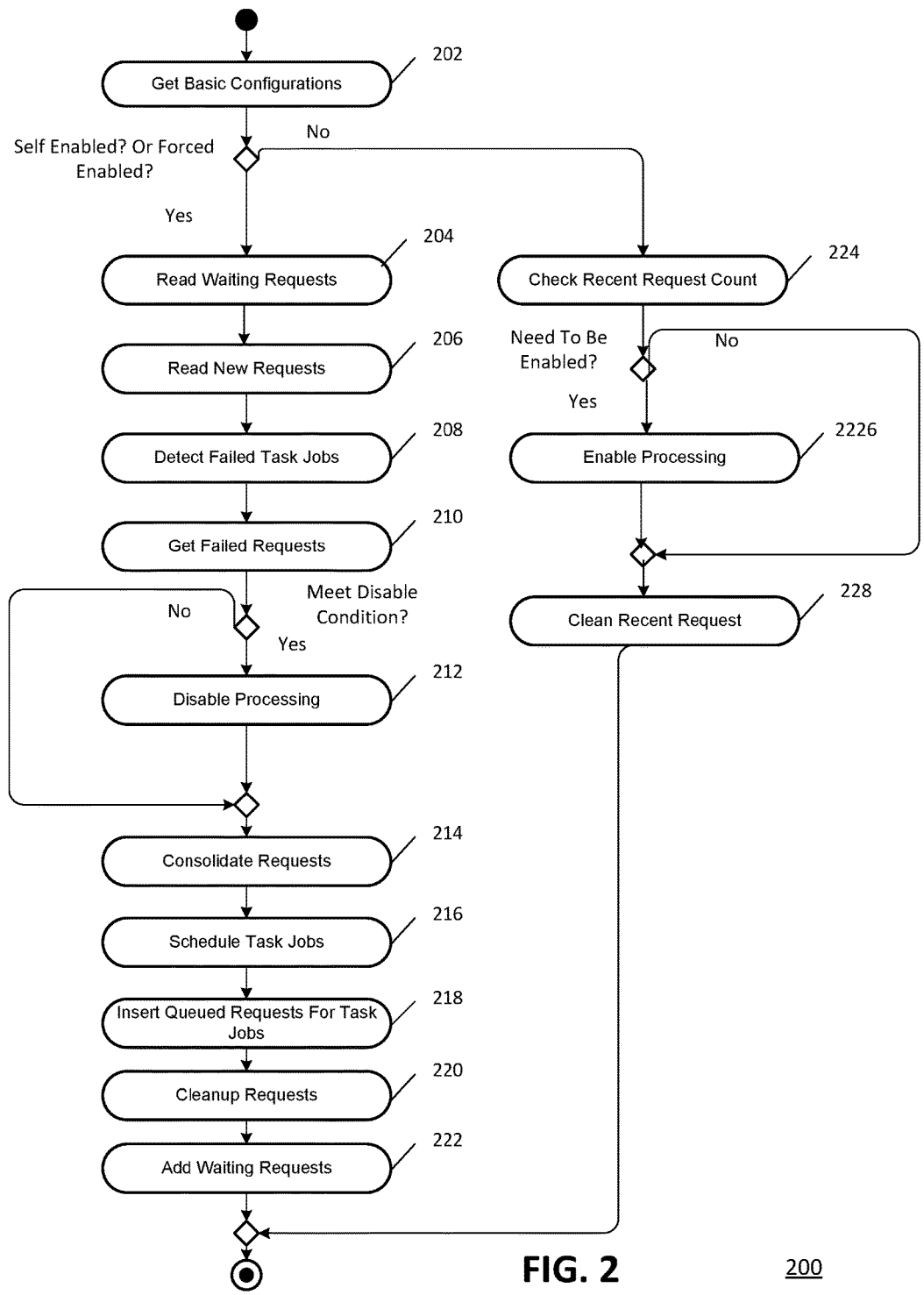
FIG. 2 is an activity diagram for each run of a master job.

FIG. 2 is an activity diagram 200 for a master job 140. Initially, at 202, the master job 140 can obtain basic configuration information from the configuration information 139 in the database 130. The configuration information 139 can include, for example, one or more of (i) if the framework is switched on and listening for the incoming requests, (ii) if a task type is forced to be enabled, (iii) if a task type is self-enabled or disabled, (iv) per each task type, what is max number of task jobs, and/or (iv) per each task type what is the max tasks to be scheduled in each task job. If the configuration information 139 indicates that it is self-enabled or force-enabled, the master job 140, at 204, reads the waiting refresh requests from the waiting requests queue 134. The force enabled status means for this task type, the master job will not check the threshold any more, and always schedule the task jobs as it is enabled. This status can be used when there is a known scheduled data migration during which there is no need to let the framework self turn on/off it which might introduce some unnecessary jitter during the process.

Next, at 206, the master job 140 reads the new refresh requests from the new requests queue 132. Furthermore, at 208, the master job 140 can detect failed task jobs and, at 210, the master job can get failed refresh requests from the failed requests queue 136. To detect a failed job, when a task job is scheduled, the queue request table has an extra column for the job ID. The master job can use this ID to check from the job framework if the job is still waiting, failed, or even to be killed. If a disable condition is met (what does this mean), then, at 212, the processing is disabled. Otherwise, at 214, multiple refresh requests (from the waiting requests queue 134, the new requests queue 132, and/or the failed requests queue 136) can be consolidated into a single task job 160 or multiple task jobs 160. These task jobs 160 are then, at 216, scheduled into which, at 218, queued requests (from the queued requests queue 138) are inserted. Once the corresponding task jobs are executed, at 220, the corresponding refresh requests are cleaned up (i.e., deleted) from the queued requests queue 138. Next, at 222, waiting requests from the waiting requests queue 134 are moved to the queued request queue 138.

Figure 3:
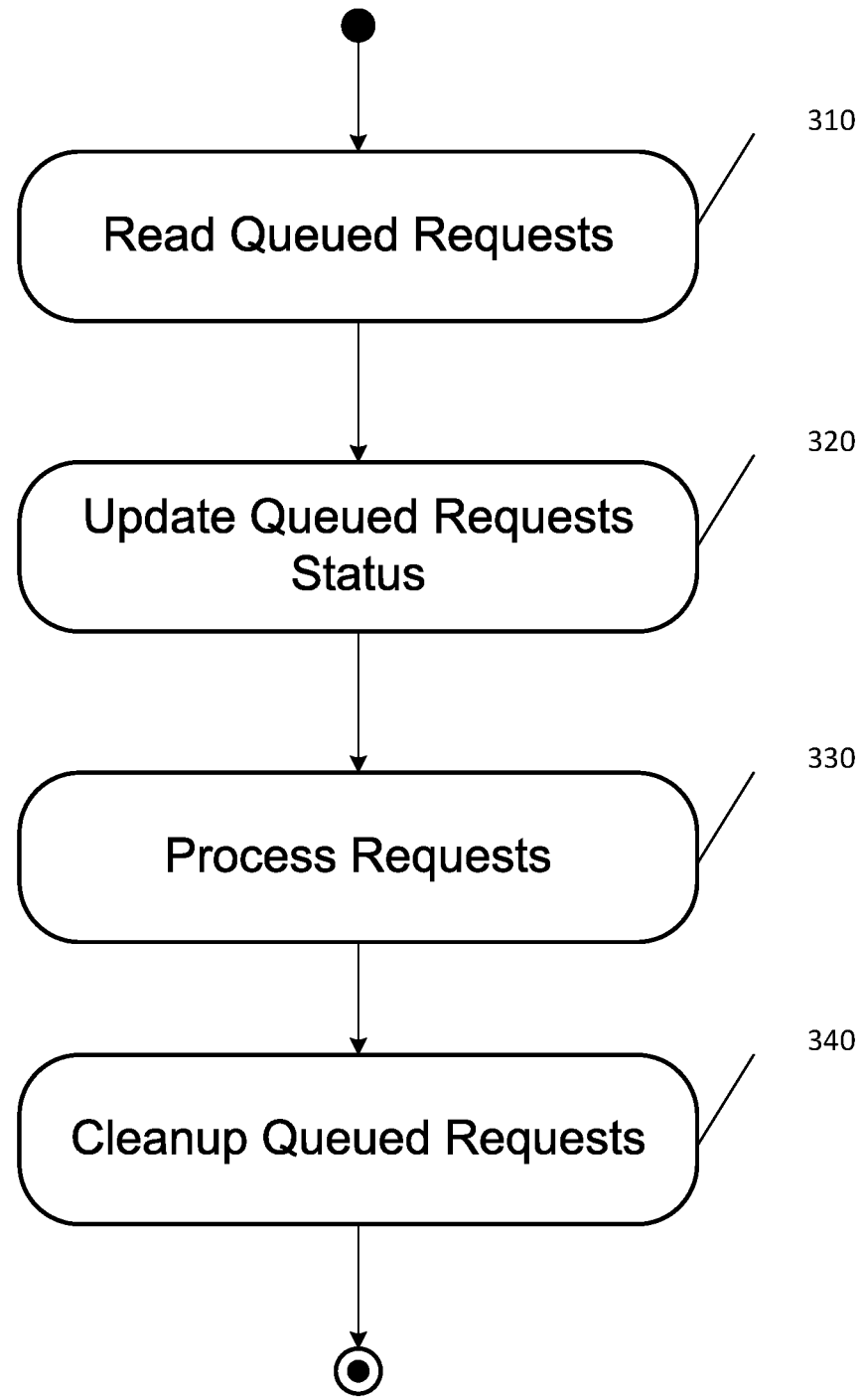
FIG. 3 is an activity diagram for each run of a task job.

FIG. 3 is an activity diagram 300 for a task job 160. Initially, at 310, the task job reads queued requests from the queued requests queue 138 in the database. Thereafter, at 320, the status of the read queued refresh requests for the task job can be changed in the queued requests queue 138 to indicate that such refresh requests are being processed. In addition, the refresh requests for the task job can be processed, at 330, and the task job 160 can cause the queued requests queue 138 to remove the corresponding refresh requests (i.e., the queued requests queue 138 can be cleaned up).

Figure 4:
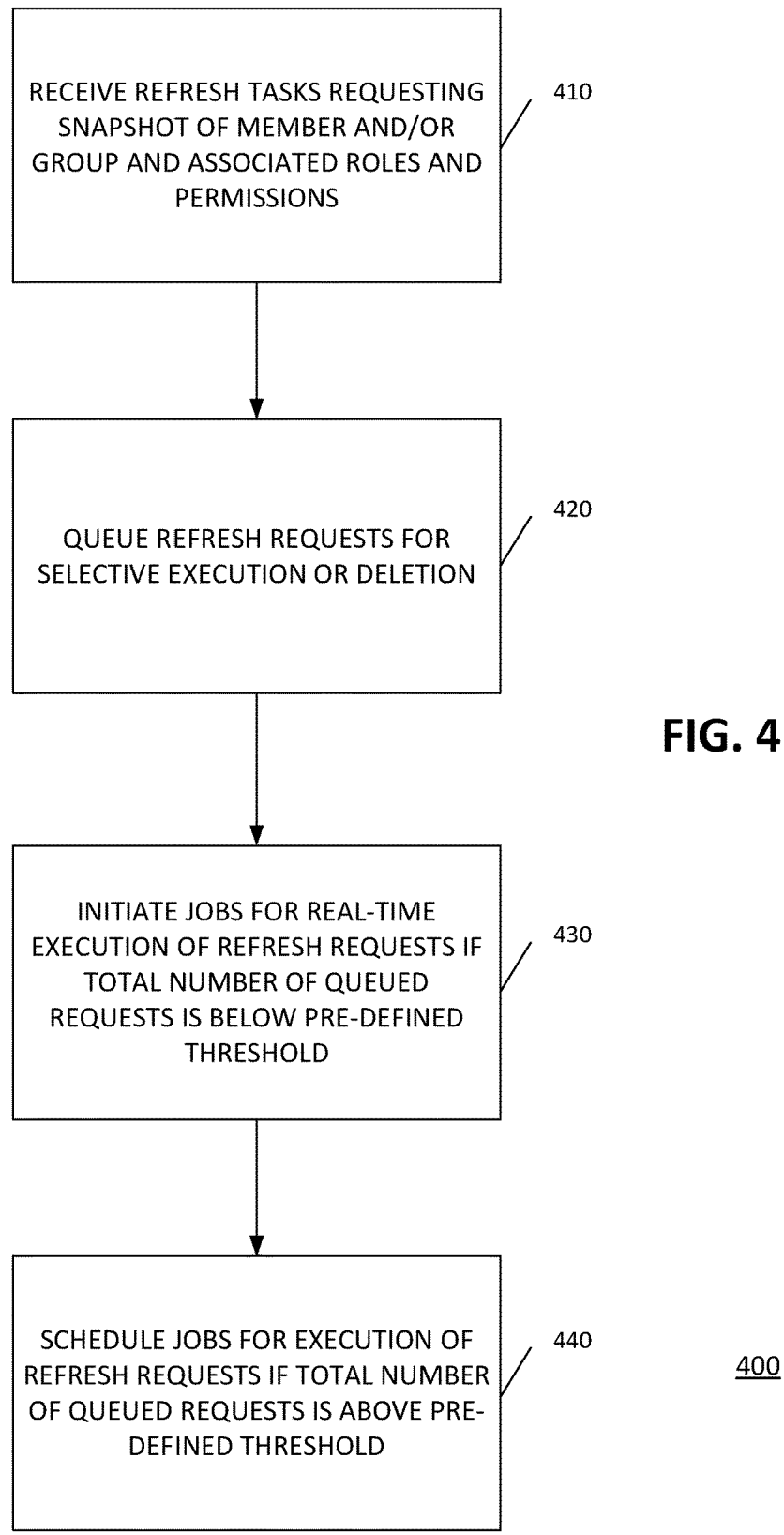
FIG. 4 is a process flow diagram illustrating execution of task jobs encapsulating one or more refresh requests by a refresh job framework.

FIG. 4 is a process flow diagram 400 in which, at 410, a data source (e.g., a database such as an in-memory database, etc.) receives a plurality of refresh requests that each request a snapshot of current members of one of a plurality of dynamically changing groups and dynamically changing rules corresponding to such group. Thereafter, at 430, the data source queues the received plurality of refresh requests for selective execution or deletion into a new request queue. Thereafter, at 430, real-time execution of refresh jobs for all of queued refresh requests is initiated if a number of refresh requests in both of the new request queue and a waiting requests queue is below a pre-defined threshold. Otherwise, at 440, a job framework schedules execution of task jobs for a subset of the queued requests in the new request queue and the waiting requests queue if a number of refresh requests in both of the new request queue and the waiting requests queue is above the pre-defined threshold, and moves any remaining refresh requests in the new request queue to the waiting requests queue after initiation of the execution of the task jobs.

Figure 5:
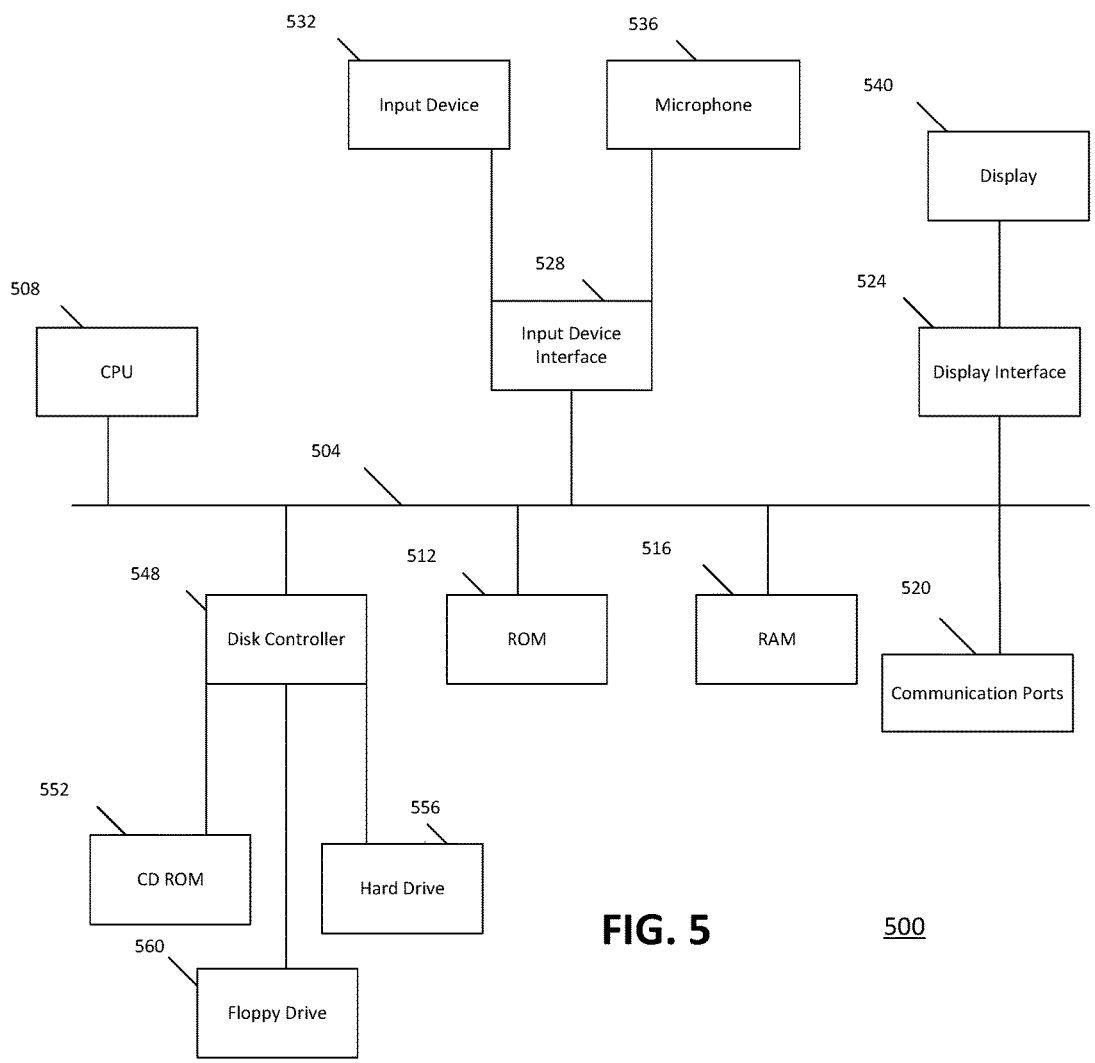
FIG. 5 is a diagram illustrating a computing device for executing one or more aspects of the current subject matter.

FIG. 5 is a diagram illustrating a sample computing device architecture for implementing various aspects described herein. A bus 504 can serve as the information highway interconnecting the other illustrated components of the hardware. A processing system 508 labeled CPU (central processing unit) (e.g., one or more computer processors/data processors at a given computer or at multiple computers), can perform calculations and logic operations required to execute a program. A non-transitory processor-readable storage medium, such as read only memory (ROM) 512 and random access memory (RAM) 514, can be in communication with the processing system 508 and may include one or more programming instructions for the operations specified here. Optionally, program instructions may be stored on a non-transitory computer-readable storage medium such as a magnetic disk, optical disk, recordable memory device, flash memory, or other physical storage medium.

In one example, a disk controller 548 can interface one or more optional disk drives to the system bus 504. These disk drives may be external or internal floppy disk drives such as 560, external or internal CD-ROM, CD-R, CD-RW or DVD, or solid state drives such as 552, or external or internal hard drives 556. As indicated previously, these various disk drives 552, 556, 560 and disk controllers are optional devices. The system bus 504 can also include at least one communication port 520 to allow for communication with external devices either physically connected to the computing system or available externally through a wired or wireless network. In some cases, the communication port 520 includes or otherwise comprises a network interface.

To provide for interaction with a user, the subject matter described herein can be implemented on a computing device having a display device 540 (e.g., a CRT (cathode ray tube) or LCD (liquid crystal display) monitor) for displaying information obtained from the bus 504 to the user and an input device 532 such as keyboard and/or a pointing device (e.g., a mouse or a trackball) and/or a touchscreen by which the user may provide input to the computer. Other kinds of devices may be used to provide for interaction with a user as well; for example, feedback provided to the user may be any form of sensory feedback (e.g., visual feedback, auditory feedback by way of a microphone 536, or tactile feedback); and input from the user may be received in any form, including acoustic, speech, or tactile input. In the input device 532 and the microphone 536 can be coupled to and convey information via the bus 504 by way of an input device interface 528. Other computing devices, such as dedicated servers, can omit one or more of the display 540 and display interface 524, the input device 532, the microphone 536, and input device interface 528.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more data processors forming part of at least one computing system, the method comprising:
   receiving, by a data source, a plurality of refresh requests that each request a snapshot of current members of one of a plurality of dynamically changing groups each having dynamically changing membership rules;
   queuing, by the data source, the received plurality of refresh requests for selective execution and deletion into a new request queue;

initiating real-time execution of refresh jobs for all of queued refresh requests if a number of refresh requests in both of the new request queue and a waiting requests queue is below a pre-defined threshold; and scheduling, by a job framework, execution of task jobs for a subset of the queued requests in the new request queue and the waiting requests queue if a number of refresh requests in both of the new request queue and the waiting requests queue is above the pre-defined threshold, and moving any remaining refresh requests in the new request queue to the waiting requests queue after initiation of the execution of the task jobs.

2. The method of claim 1, wherein the real-time execution of the refresh jobs or the scheduled execution of task jobs at pre-defined intervals is continually initiated.

3. The method of claim 1, wherein refresh requests from the queued requests queue are inserted into the task jobs after they are scheduled for execution.

4. The method of claim 1, wherein:
the data source further comprises a failed requests queue in which refresh requests for failed task jobs are queued;
the real-time refresh jobs corresponding to all of the queued refresh requests are executed only if the number of refresh requests in all of the new request queue, the waiting requests queue, and the failed requests is below the pre-defined threshold; and
execution of the task jobs corresponding to the subset of the queued refresh requests are executed only if the number of refresh requests in all of the new request queue, the waiting requests queue, and the failed requests is above the pre-defined threshold.

5. The method of claim 1 further comprising: modifying a queue request status for each queued request after a status of such queued request changes.

6. The method of claim 4 further comprising: cleaning up queued requests from a respective queue after completion of the execution of the corresponding task job.

7. The method of claim 1 further comprising: deleting duplicative refresh requests within the new requests queue to avoid executing duplicative task jobs.

8. The method of claim 1 further comprising: consolidating overlapping refresh requests within the new requests queue into a single refresh request so that only a single corresponding task job is subsequently executed.

9. The method of claim 1, wherein the data source is a database.

10. The method of claim 9, wherein the database comprises an in-memory database storing data primarily in main memory.

11. The method of claim 1 further comprising:
receiving, by an application server, the plurality of refresh requests from a plurality of remote clients; and
relaying, by the application server to the database, the plurality of refresh requests.

12. The method of claim 11 further comprising:
receiving results responsive to one or more refresh requests encapsulated in one of the real-time refresh jobs or the tasks jobs; and
transmitting the received results to the application server for relay to a corresponding remote client.

13. The method of claim 1, wherein each task job encapsulates a plurality of refresh requests.

14. A system comprising:
at least one data processor; and
memory storing instructions which, when executed by the at least one data processor, result in operations comprising:
receiving, by a data source, a plurality of refresh requests that each request a snapshot of current members of one of a plurality of dynamically changing groups each having dynamically changing membership rules;
queuing, by the data source, the received plurality of refresh requests for selective execution and deletion into a new request queue;
initiating real-time execution of refresh jobs for all of queued refresh requests if a number of refresh requests in both of the new request queue and a waiting requests queue is below a pre-defined threshold; and
scheduling, by a job framework, execution of task jobs for a subset of the queued requests in the new request queue and the waiting requests queue if a number of refresh requests in both of the new request queue and the waiting requests queue is above the pre-defined threshold, and moving any remaining refresh requests in the new request queue to the waiting requests queue after initiation of the execution of the task jobs.

15. The system of claim 14 further comprising the data source.

16. The system of claim 15, wherein the data source is an in-memory database.

17. The system of claim 14, wherein:
the real-time execution of the refresh jobs or the scheduled execution of task jobs at pre-defined intervals is continually initiated;
refresh requests from the queued requests queue are inserted into the task jobs after they are scheduled for execution.

18. The system of claim 14, wherein:
the data source further comprises a failed requests queue in which refresh requests for failed task jobs are queued;
the real-time refresh jobs corresponding to all of the queued refresh requests are executed only if the number of refresh requests in all of the new request queue, the waiting requests queue, and the failed requests is below the pre-defined threshold;
execution of the task jobs corresponding to the subset of the queued refresh requests are executed only if the number of refresh requests in all of the new request queue, the waiting requests queue, and the failed requests is above the pre-defined threshold.

19. The system of claim 14, wherein the operations further comprise:
modifying a queue request status for each queued request after a status of such queued request changes;
cleaning up queued requests from a respective queue after completion of the execution of the corresponding task job;
deleting duplicative refresh requests within the new requests queue to avoid executing duplicative task jobs;
consolidating overlapping refresh requests within the new requests queue into a single refresh request so that only a single corresponding task job is subsequently executed.

20. A non-transitory computer program product storing instructions which, when executed by at least one data processor forming part of at least one computing device, result in operations comprising:

receiving, by a data source, a plurality of refresh requests that each request a snapshot of current members of one of a plurality of dynamically changing groups each having dynamically changing membership rules;

queuing, by the data source, the received plurality of refresh requests for selective execution and deletion into a new request queue;

initiating real-time execution of refresh jobs for all of queued refresh requests if a number of refresh requests in both of the new request queue and a waiting requests queue is below a pre-defined threshold; and scheduling, by a job framework, execution of task jobs for a subset of the queued requests in the new request queue and the waiting requests queue if a number of refresh requests in both of the new request queue and the waiting requests queue is above the pre-defined threshold, and moving any remaining refresh requests in the new request queue to the waiting requests queue after initiation of the execution of the task jobs.

* * * * *